US010352156B2

(12) United States Patent
Wilson et al.

(10) Patent No.: US 10,352,156 B2
(45) Date of Patent: Jul. 16, 2019

(54) ELECTROMAGNETIC TELEMETRY USING CAPACITIVE ELECTRODES

(71) Applicant: Halliburton Energy Services, Inc., Houston, TX (US)

(72) Inventors: Glenn Andrew Wilson, Singapore (SG); Paul Andrew Cooper, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/538,110

(22) PCT Filed: Aug. 3, 2016

(86) PCT No.: PCT/US2016/045438
§ 371 (c)(1),
(2) Date: Jun. 20, 2017

(87) PCT Pub. No.: WO2017/024083
PCT Pub. Date: Feb. 9, 2017

(65) Prior Publication Data
US 2018/0135409 A1 May 17, 2018

Related U.S. Application Data

(60) Provisional application No. 62/200,432, filed on Aug. 3, 2015.

(51) Int. Cl.
*E21B 47/12* (2012.01)
*G01V 3/30* (2006.01)
*H04B 1/38* (2015.01)

(52) U.S. Cl.
CPC .............. *E21B 47/122* (2013.01); *G01V 3/30* (2013.01); *H04B 1/38* (2013.01)

(58) Field of Classification Search
None
See application file for complete search history.

(56) References Cited

U.S. PATENT DOCUMENTS

| 2005/0046588 | A1 | 3/2005 | Wisler et al. |
| 2006/0289196 | A1* | 12/2006 | Lee .......................... H01B 7/30 174/110 R |
| 2008/0246485 | A1 | 10/2008 | Hibbs et al. |
| 2010/0003785 | A1* | 1/2010 | Wong ................... H01L 21/563 438/108 |

(Continued)

FOREIGN PATENT DOCUMENTS

WO   WO 2012/100217 A1   7/2012

OTHER PUBLICATIONS

Hibbs, et al., "Capacitive Electric Field Measurements For Geophysics," EAGE Conference and Exhibition, Expanded Abstracts, 2011.

(Continued)

*Primary Examiner* — Laura N Nguyen
(74) *Attorney, Agent, or Firm* — Haynes and Boone, LLP

(57) ABSTRACT

An electromagnetic (EM) telemetry system with capacitive electrodes for use with downhole equipment is described. Embodiments of the EM telemetry system with capacitive electrodes include a downhole transceiver comprising an encoded signal transmitter, a downhole sensor disposed to monitor the downhole equipment, and an encoded signal receiver comprising one or more capacitive counter electrodes. The one or more capacitive counter electrodes receives a first encoded signal from the downhole transceiver, the encoded signal corresponding to a voltage measured between the counter electrode and a wellhead. A decoder and demodulator of the encoded signal receiver recovers information in the first encoded signal. A second encoded signal, which may include instructions for the downhole equipment, may be similarly encoded, modulated, and transmitted from the encoded signal receiver to the downhole transceiver.

19 Claims, 7 Drawing Sheets

(56) References Cited

U.S. PATENT DOCUMENTS

| | | | |
|---|---|---|---|
| 2010/0326319 A1* | 12/2010 | Lee | C09D 1/02 |
| | | | 106/14.44 |
| 2011/0032117 A1 | 2/2011 | Contant et al. | |
| 2012/0293179 A1 | 11/2012 | Colombo et al. | |
| 2014/0247133 A1* | 9/2014 | Petrovic | G01V 11/002 |
| | | | 340/854.6 |
| 2014/0361777 A1 | 12/2014 | Marsala et al. | |
| 2015/0061683 A1 | 3/2015 | Marsala et al. | |
| 2015/0061684 A1* | 3/2015 | Marsala | E21B 49/00 |
| | | | 324/355 |
| 2015/0160364 A1* | 6/2015 | Hibbs | E21B 47/102 |
| | | | 324/355 |
| 2017/0362931 A1* | 12/2017 | Homan | E21B 47/122 |

OTHER PUBLICATIONS

International Search Report and The Written Opinion of the International Search Authority, or the Declaration, dated Nov. 3, 2016, PCT/US2016/045438, 12 pages, ISA/KR.

Petiau, "Second Generation Of Lead-Lead Chloride Electrodes for Geophysical Applications," Pure and Applied Geophysics, 2000, vol. 157, pp. 357-382.

Thiel, "On Measuring Electromagnetic Surface Impedance," IEEE Transactions on Antennas and Propagation, 2000, vol. 48, pp. 1517-1520.

Zonge, et al. "The Effect Of Electrode Contact Resistance on Electric Field Measurements," SEG Annual Meeting, Extended Abstracts, 1985.

Hibbs, et al. "New Electromagnetic Sensors for Magnetotelluric And Induced Polarization Geophysical Surveys," In SEG Technical Program Expanded Abstracts, Society of Exploration Geophysicists, Sep. 2012, pp. 1-5.

Macnae, "Electric Field Measurements In Air," SEG Annual Meeting, Expanded Abstracts.

Macnae, et al., "Near-Surface Resistivity Contrast Mapping With a Capacitive Sensor Array And An Inductive Source," Geophysics, vol. 76, No. 2, pp. G13-G23.

* cited by examiner

US 10,352,156 B2

ELECTROMAGNETIC TELEMETRY USING CAPACITIVE ELECTRODES

RELATED APPLICATIONS

The present application is a U.S. National Stage patent application of International Application No. PCT/US2016/045438, filed on Aug. 3, 2016, which claims priority to U.S. Provisional Application No. 62/200,432, filed on Aug. 3, 2015, the disclosures of which are hereby incorporated by reference in their entirety.

BACKGROUND OF THE DISCLOSURE

Field of the Disclosure

The disclosure generally relates to systems and methods for electromagnetic (EM) telemetry. The disclosure specifically relates to EM telemetry using capacitive electrodes during drilling, measurement-while-drilling (MWD), and/or logging-while-drilling (LWD) operations.

Background

Electromagnetic (EM) telemetry is a method of communicating from a bottom-hole assembly (BHA) to the surface of a wellbore in drilling applications. For example, the ability to transmit and receive drilling dynamics data may allow for faster drilling, while the ability to transmit and receive formation evaluation data, such as measurement-while-drilling (MWD) and/or logging-while-drilling (LWD) data, may allow for accurate well placement to maximize reservoir value. EM telemetry systems typically operate at frequencies between 1 and 50 Hz, with data rates nominally between 3 and 12 bps from a limited number of communication channels.

Like many communication techniques, one goal of EM telemetry is to provide robust encoded communication signals and high data rates in the presence of noise. The communications signals used in EM telemetry systems may be characterized by a signal-to-noise ratio (SNR) given by the ratio between the strength of the communication signal and the strength of the noise signal. In general, improving the SNR corresponds to improved accuracy of a communication technique, which may be utilized to design communication systems with higher effective data rates, more channels, lower bit error rates, and/or the like.

A further goal of an EM telemetry system and its constituent components is to support rapid installation, to operate stably under a variety of operating conditions, and to have a long operational lifetime. For example, it is desirable for the constituent components of an EM telemetry system to quickly stabilize to the surrounding environment upon installation and to resist degradation, corrosion, and/or the like. Because various components of a typical EM telemetry system interact and/or interface (e.g., mechanically, electrically, and/or chemically interact) with relatively harsh environments, such as earth formations, fluids, and/or bodies of water, rapid stabilization, stable operation, and corrosion resistance may be challenging to achieve using conventional systems and methods.

Accordingly, there is a need for a system and method for improving the SNR, stabilization time, stability, and lifetime of EM telemetry systems.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which.

DETAILED DESCRIPTION OF THE DISCLOSURE

Figure 1:
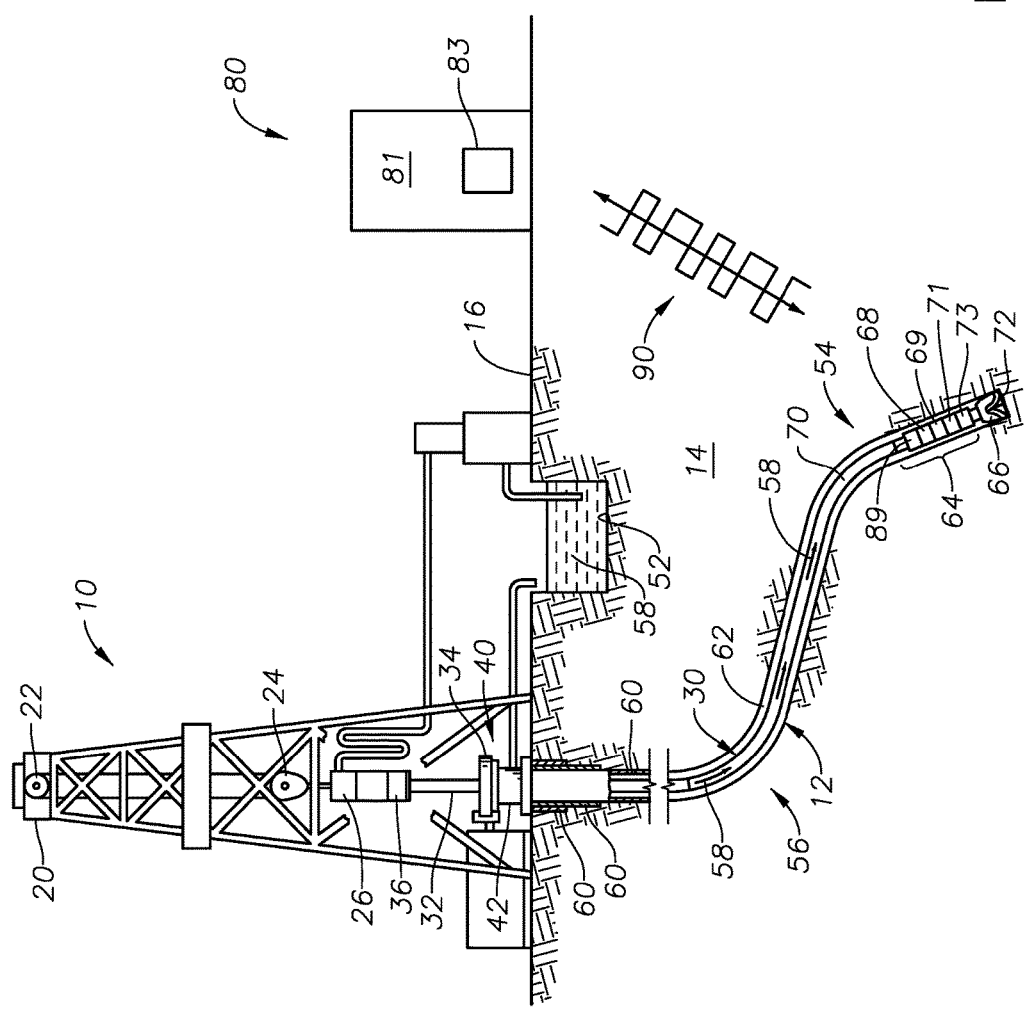
FIG. 1 is a plan view of a land based drilling system incorporating an EM telemetry system of the disclosure.

The disclosure may repeat reference numerals and/or letters in the various examples or figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the figures. For example, if an apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover, even though a figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a figure may depict an onshore operation, it should be understood by those skilled in the art that the apparatus according to the present disclosure is equally well suited for use in offshore operations and vice-versa. Further, unless otherwise noted, even though a figure may depict a cased hole, it should be understood by those skilled in the art that the apparatus according to the present disclosure is equally well suited for use in open hole operations.

Generally, in one or more embodiments, an EM telemetry system is provided wherein capacitive electrodes are used to improve the detection of encoded signals transmitted and received using EM telemetry during drilling, logging-while-drilling (LWD), measurement-while-drilling (MWD) operations, production operations or other downhole operations. The use of capacitive electrodes in an EM telemetry system offers numerous advantages over conventional EM telemetry systems, including low electrode-formation contact resistance, long operational lifetime, low temperature drift, no electrochemical noise, short stabilization times, and easy deployment.

Figure 2:
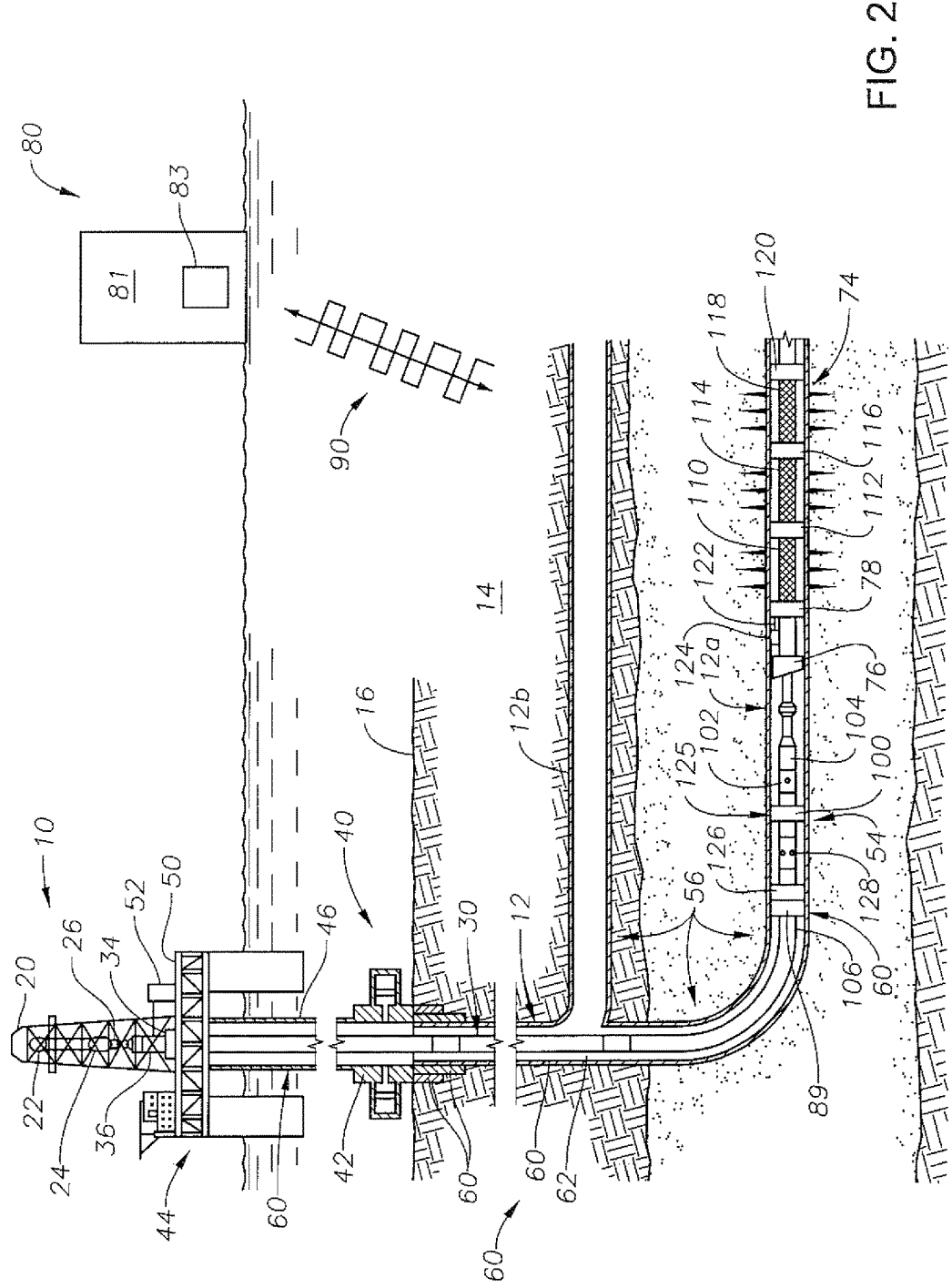
FIG. 2 is a plan view of a marine based production system having an EM telemetry system of the disclosure.

Turning to FIGS. 1 and 2, shown is an elevation view in partial cross-section of a wellbore drilling and production system 10 utilized to produce hydrocarbons from wellbore 12 extending through various earth strata in an oil and gas formation 14 located below the earth's surface 16. Wellbore 12 may be formed of a single or multiple bores 12a, 12b . . . 12n (illustrated in FIG. 2), extending into the formation 14, and disposed in any orientation, such as the horizontal wellbore 12b illustrated in FIG. 2.

Drilling and production system 10 includes a drilling rig or derrick 20. Drilling rig 20 may include a hoisting apparatus 22, a travel block 24, and a swivel 26 for raising and lowering casing, drill pipe, coiled tubing, production tubing, other types of pipe or tubing strings or other types of conveyance vehicles, such as wireline, slickline, and the like 30. In FIG. 1, conveyance vehicle 30 is a substantially tubular, axially extending drill string formed of a plurality of drill pipe joints coupled together end-to-end, while in FIG. 2, conveyance vehicle 30 is completion tubing supporting a completion assembly as described below. Drilling rig 20 may include a kelly 32, a rotary table 34, and other equipment associated with rotation and/or translation of tubing string 30 within a wellbore 12. For some applications, drilling rig 20 may also include a top drive unit 36.

Drilling rig 20 may be located proximate to a wellhead 40 as shown in FIG. 1, or spaced apart from wellhead 40, such as in the case of an offshore arrangement as shown in FIG. 2. One or more pressure control devices 42, such as blowout preventers (BOPs) and other equipment associated with drilling or producing a wellbore may also be provided at wellhead 40 or elsewhere in the system 10.

For offshore operations, as shown in FIG. 2, whether drilling or production, drilling rig 20 may be mounted on an oil or gas platform 44, such as the offshore platform as illustrated, semi-submersibles, drill ships, and the like (not shown). Although system 10 of FIG. 2 is illustrated as being a marine-based production system, system 10 of FIG. 2 may be deployed on land. Likewise, although system 10 of FIG. 1 is illustrated as being a land-based drilling system, system 10 of FIG. 1 may be deployed offshore. In any event, for marine-based systems, one or more subsea conduits or risers 46 extend from deck 50 of platform 44 to a subsea wellhead 40. Tubing string 30 extends down from drilling rig 20, through subsea conduit 46 and BOP 42 into wellbore 12.

A working or service fluid source 52 may supply a working fluid 58 pumped to the upper end of tubing string 30 and flow through tubing string 30. Working fluid source 52 may supply any fluid utilized in wellbore operations, including without limitation, drilling fluid, cementious slurry, acidizing fluid, liquid water, steam or some other type of fluid.

Wellbore 12 may include subsurface equipment 54 disposed therein, such as, for example, a drill bit and bottom hole assembly (BHA), a completion assembly or some other type of wellbore tool.

Wellbore drilling and production system 10 may generally be characterized as having a pipe system 56. For purposes of this disclosure, pipe system 56 may include casing, risers, tubing, drill strings, completion or production strings, subs, heads or any other pipes, tubes or equipment that attaches to the foregoing, such as string 30 and conduit 46, as well as the wellbore and laterals in which the pipes, casing and strings may be deployed. In this regard, pipe system 56 may include one or more casing strings 60 cemented in wellbore 12, such as the surface, intermediate and production casing 60 shown in FIG. 1. An annulus 62 is formed between the walls of sets of adjacent tubular components, such as concentric casing strings 60 or the exterior of tubing string 30 and the inside wall of wellbore 12 or casing string 60, as the case may be.

Where subsurface equipment 54 is used for drilling and conveyance vehicle 30 is a drill string, the lower end of drill string 30 may include bottom hole assembly (BHA) 64, which may carry at a distal end a drill bit 66. During drilling operations, weigh-on-bit (WOB) is applied as drill bit 66 is rotated, thereby enabling drill bit 66 to engage formation 14 and drill wellbore 12 along a predetermined path toward a target zone. In general, drill bit 66 may be rotated with drill string 30 from rig 20 with top drive 36 or rotary table 34, and/or with a downhole mud motor 68 within BHA 64. The working fluid 58 may be pumped to the upper end of drill string 30 and flow through the longitudinal interior 70 of drill string 30, through bottom hole assembly 64, and exit from nozzles formed in drill bit 66. At bottom end 72 of wellbore 12, drilling fluid 58 may mix with formation cuttings, formation fluids and other downhole fluids and debris. The drilling fluid mixture may then flow upwardly through an annulus 62 to return formation cuttings and other downhole debris to the surface 16.

Bottom hole assembly 64 and/or drill string 30 may include various other tools, including a power source 69, mechanical subs 71 such as directional drilling subs, and measurement equipment 73, such as measurement while drilling (MWD) and/or logging while drilling (LWD) instruments, sensors, circuits, or other equipment to provide information about wellbore 12 and/or formation 14, such as logging or measurement data from wellbore 12. Measurement data and other information from the tools may be communicated using electrical signals, acoustic signals or other telemetry that can be converted to electrical signals at the rig 20 to, among other things, monitor the performance of drilling string 30, bottom hole assembly 64, and associated drill bit 66, as well as monitor the conditions of the environment to which the bottom hole assembly 64 is subjected.

With respect to FIG. 2 where subsurface equipment 54 is illustrated as completion equipment, disposed in a substantially horizontal portion of wellbore 12 is a lower completion assembly 74 that includes various tools such as an orientation and alignment subassembly 76, a packer 78, a sand control screen assembly 110, a packer 112, a sand control screen assembly 114, a packer 116, a sand control screen assembly 118 and a packer 120.

Extending downhole from lower completion assembly 74 is one or more communication cables 122, such as a sensor or electric cable, that passes through packers 78, 112 and 116 and is operably associated with one or more electrical devices 124 associated with lower completion assembly 74, such as sensors position adjacent sand control screen assemblies 110, 114, 118 or at the sand face of formation 14, or downhole controllers or actuators used to operate downhole tools or fluid flow control devices. Cable 122 may operate as communication media, to transmit power, or data and the like between lower completion assembly 74 and an upper completion assembly 125.

In this regard, disposed in wellbore 12 at the lower end of tubing string 30 is an upper completion assembly 125 that includes various tools such as a packer 126, an expansion joint 128, a packer 100, a fluid flow control module 102 and an anchor assembly 104.

Extending uphole from upper completion assembly 125 are one or more communication cables 106, such as a sensor cable or an electric cable, which passes through packers 126, 100 and extends to the surface 16. Cable 106 may operate as communication media, to transmit power, or data and the like between a surface controller (not pictured) and the upper and lower completion assemblies 125, 74.

Shown deployed in FIG. 1 and FIG. 2 is an electromagnetic (EM) telemetry system 80 using capacitive electrodes according to some embodiments. In one or more embodiments, EM telemetry system 80 includes a surface assembly 81 having a counter electrode 83 and a downhole transceiver 89. EM telemetry system 80 allows for communication between surface assembly 81 and downhole transceiver 89. For example, EM telemetry system 80 may allow communication between a control and/or data acquisition module coupled to surface assembly 81 and downhole equipment and/or sensor(s) coupled to downhole transceiver 89. In one or more embodiments, EM telemetry system 80 may be bidirectional; that is, one or both of surface assembly 81 and downhole transceiver 89 may be configured as a transmitter and/or receiver of EM telemetry system 80 at a given time. In furtherance of such embodiments, any suitable duplexing technique may be utilized, such as time division duplexing, frequency division duplexing, and/or the like. In one or more embodiments, EM telemetry system 80 may be unidirectional.

Encoded signal 90, as depicted in FIG. 1 and FIG. 2, is a time-varying electromagnetic field that carries information between surface assembly 81 and downhole transceiver 89. For example, encoded signal 90 may carry the measurement and/or logging data acquired by the downhole equipment and/or downhole sensors, the data being transmitted to the surface for further processing. Because encoded signal 90 may be transmitted and received during drilling operation, EM telemetry system 80 is suitable for measurement-while-drilling (MWD) and/or logging-while-drilling applications. For example, the encoded signal 90 may carry measurement data, logging data, and/or instructions for drilling tools, such as directions used for directional drilling applications. In one or more embodiments, the information carried by encoded signal 90 may be in a digital and/or analog format. Accordingly, any suitable digital and/or analog encoding and/or modulation schemes may be employed to achieve reliable, secure, and/or high speed communication between downhole transceiver 89 and surface assembly 81. In one or more embodiments, the encoding and modulation scheme may include pulse width modulation, pulse position modulation, on-off keying, amplitude modulation, frequency modulation, single-side-band modulation, frequency shift keying, phase shift keying (e.g., binary phase shift keying and/or M-ary phase shift keying), discrete multi-tone, orthogonal frequency division multiplexing, and/or the like. In one or more embodiments, encoded signal 90 may have a frequency range between 1 Hz and 50 Hz and a nominal data rate of between 3 and 12 bits per second.

When EM telemetry system 80 operates with downhole transceiver 89 as the transmitter and surface assembly 81 as the receiver, encoded signal 90 is generated by applying a voltage signal across a gap in downhole transceiver 89. For example, the gap may electrically insulate drill bit 66 from drill string 30. More generally, the gap electrically insulates a portion of system 10 that is electrically coupled to wellhead 40 from a portion of system 10 that is electrically coupled to formation 14. In one or more embodiments, the applied voltage signal may have a strength of approximately 3 V (e.g., nominally between 0.5 and 5 V). Encoded signal 90 propagates through the earth and drill string 30 to surface assembly 81. At the surface, counter electrode 83 measures a voltage signal corresponding to encoded signal 90, the voltage signal being determined based on a differential voltage between counter electrode 83 and wellhead 40. The measured voltage signal is demodulated and/or decoded to recover the information carried by encoded signal 90. In one or more embodiments, the measured voltage signal may have a strength of approximately 10 µV. Similarly, when EM telemetry system 80 operates with surface assembly 81 as the transmitter and downhole transceiver 89 as the receiver of encoded signal 90, encoded signal 90 is transmitted by applying a voltage signal between counter electrode 83 and wellhead 40. A corresponding voltage signal across the gap in downhole transceiver is measured, demodulated, and/or decoded to recover the information carried by encoded signal 90.

Figure 3:
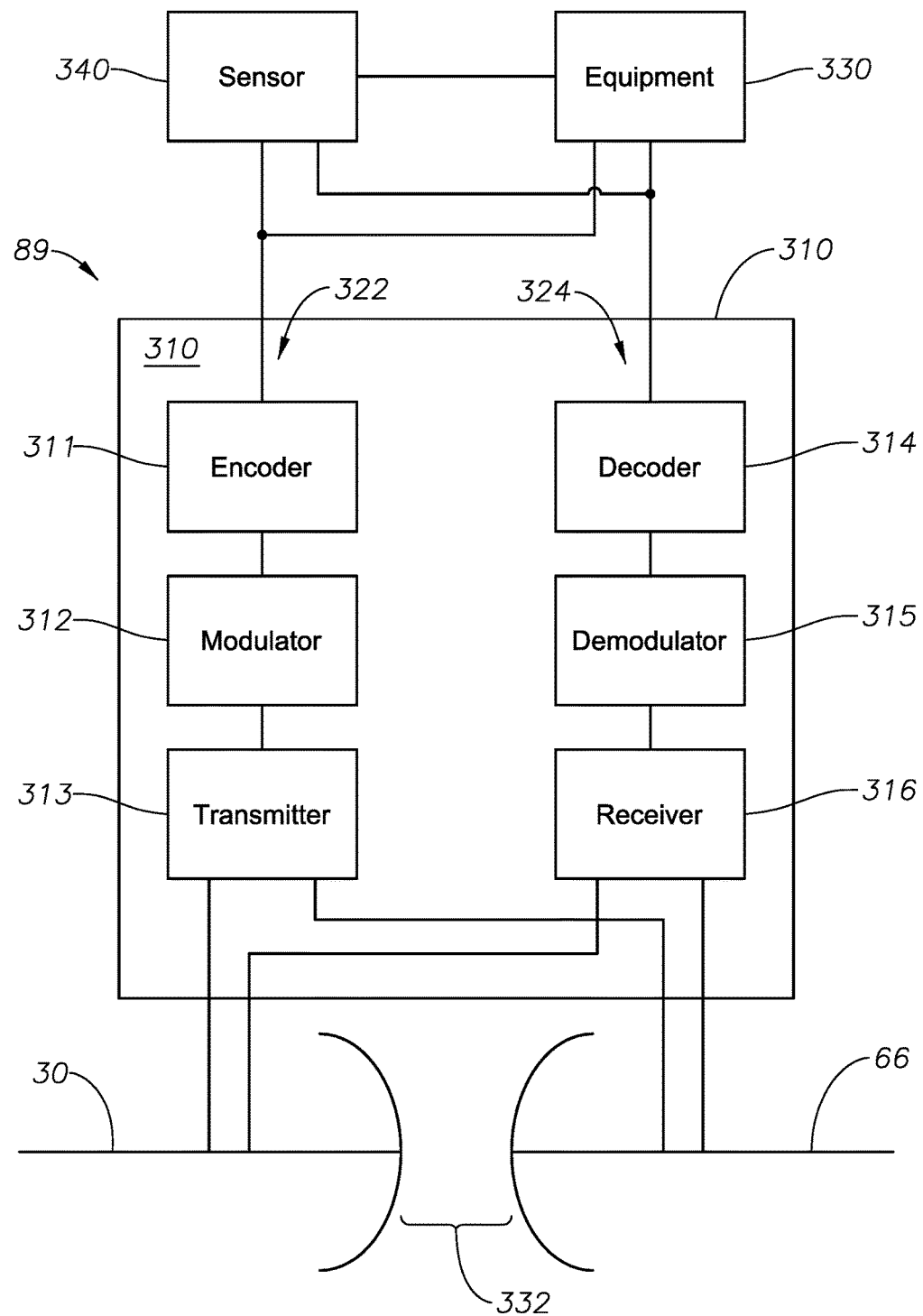
FIG. 3 is a plan view of a downhole transceiver of an EM telemetry system of the disclosure.

Although downhole transceiver 89 is not limited to a particular type or configuration, FIG. 3 illustrates one embodiment of downhole transceiver 89. In one or more embodiments, downhole transceiver 89 may be configured as an encoded signal transmitter of EM telemetry system 80. In furtherance of such embodiments, downhole transceiver 89 may include a controller 310 that includes an encoder 311, a modulator 312, and a transmitter 313. In one or more embodiments, downhole transceiver 89 may be additionally and/or alternately configured as a receiver of EM telemetry system 80. In furtherance of such embodiments, controller 310 may include a decoder 314, a demodulator 315, and a receiver 316. In one or more embodiments, encoder 311 may be coupled to one or more downhole data sources, such downhole equipment 330 and/or a downhole sensor 340, and may receive analog and/or digital data from said data sources over input interface 322. Encoder 311 may convert the received data into a stream of bits, modulator 312 may convert the stream of bits into analog and/or digital symbols, and transmitter 313 may convert the symbols into a voltage signal corresponding to encoded signal 90. In one or more embodiments, encoder 311 may perform various operations on the incoming data including source encoding, interleaving, encryption, channel encoding, convolutional encoding, and/or the like. In one or more embodiments, modulator 312 may modulate the incoming stream of bits according to a variety of modulation schemes including pulse width modulation, pulse position modulation, on-off keying, amplitude modulation, frequency modulation, single-side-band modulation, frequency shift keying, phase shift keying (e.g., binary phase shift keying and/or M-ary phase shift keying), discrete multi-tone, orthogonal frequency division multiplexing, and/or the like. The voltage signal is applied between a gap 332 in downhole transceiver 89. As depicted in FIG. 3, gap 332 electrically insulates drill bit 66 from drill string 30 in accordance with FIG. 1. However, it is to be understood that gap 332 may separate other downhole components, such as wireline 30 from upper completion assembly 125 as depicted in FIG. 2. Analogously, where downhole transceiver 89 is configured as an encoded signal receiver of EM telemetry system 80, decoder 314, demodulator 315, and receiver 316 may operate to measure a voltage signal across gap 332 and demodulate/decode the measured voltage signal to provide output analog and/or digital data to one or more downhole tools over output interface 324.

In one or more embodiments, downhole sensor 340 may be associated with, coupled to, and/or otherwise disposed to monitor downhole equipment 330 and may transmit information (e.g., measurement and/or logging data) associated with downhole equipment 330 to surface assembly 81 through controller 310. In one or more embodiments, downhole equipment 330 may receive instructions from surface assembly 81 through controller 310. In some embodiments, downhole equipment 330 may include drilling equipment, logging-while-drilling (LWD) equipment, measurement-while-drilling (MWD) equipment, production equipment, and/or the like. In some embodiments, downhole sensor 340 may include one or more temperature sensors, pressure sensors, strain sensors, pH sensors, density sensors, viscosity sensors, chemical composition sensors, radioactive sensors, resistivity sensors, acoustic sensors, potential sensors, mechanical sensors, nuclear magnetic resonance logging sensors, gravity sensor, a pressure sensor, a fixed length line sensor, optical tracking sensor, a fluid metering sensor, an acceleration integration sensor, a velocity timing sensor, an odometer, a magnetic feature tracking sensor, an optical feature tracking sensor, an electrical feature tracking sensor, an acoustic feature tracking sensor, a dead reckoning sensor, a formation sensor, an orientation sensor, an impedance type sensor, a diameter sensor, and/or the like.

Figure 4:
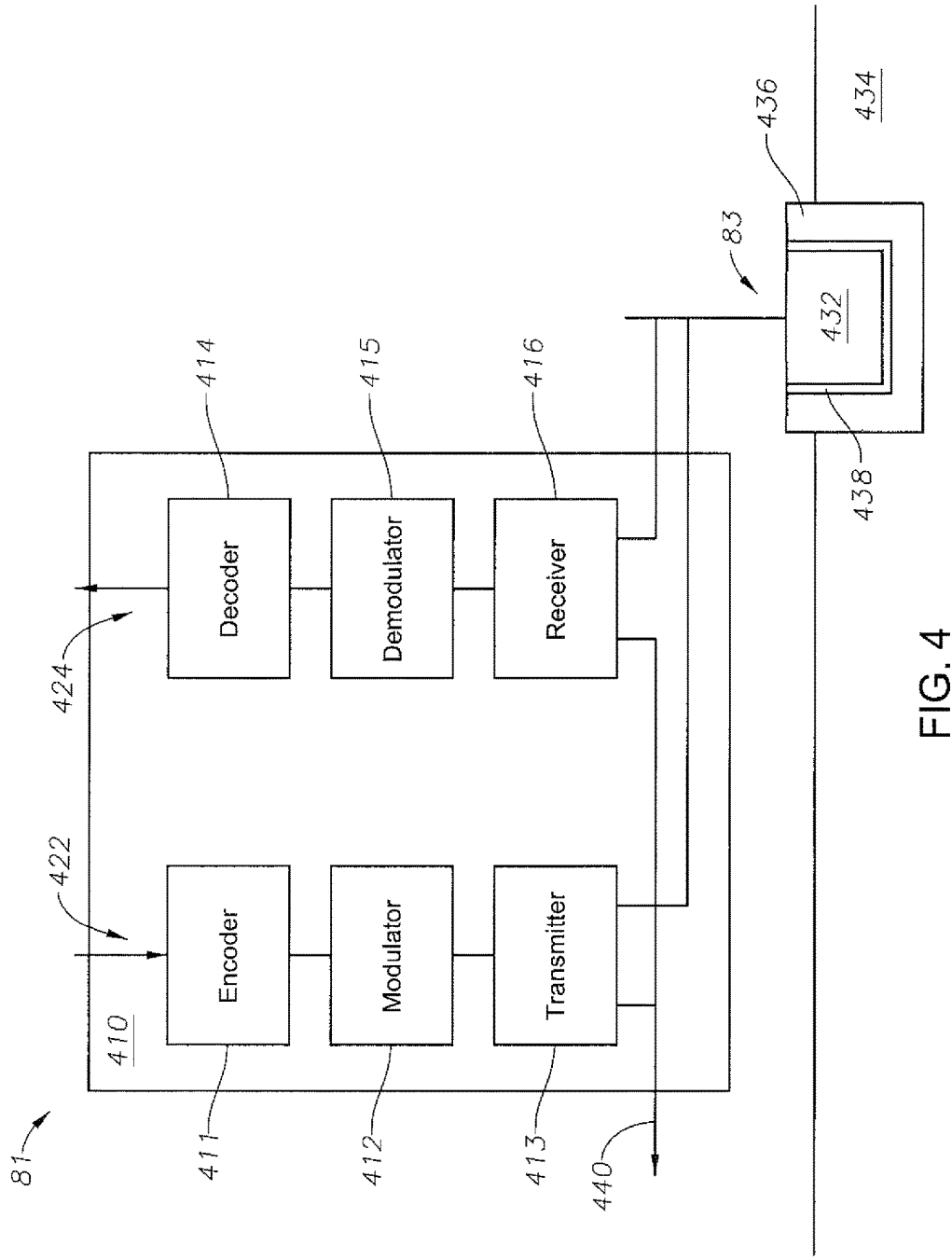
FIG. 4 is a plan view of a surface assembly of an EM telemetry system of the disclosure.

Although surface assembly 81 is not limited to a particular type or configuration, FIG. 4 illustrates one embodiment of surface assembly 81. In one or more embodiments, surface assembly 81 may be configured as an encoded signal transmitter of EM telemetry system 80. In furtherance of such embodiments, surface assembly 81 may include a controller 410 that includes an encoder 411, a modulator 412, and a transmitter 413, as described above with respect to FIG. 3. In one or more embodiments, surface assembly 81 may be additionally and/or alternately configured as an encoded signal receiver of EM telemetry system 80. In furtherance of such embodiments, controller 410 may include a decoder 414, a demodulator 415, and/or a receiver 416. The functions performed by decoder 414, demodulator 415, and receiver 416 on the received data generally mirror the functions performed by encoder 311, modulator 312, and transmitter 313 depicted in FIG. 3. Thus, for example, decoder 414 may perform source decoding, de-interleaving, channel decoding, convolutional decoding, and/or the like. Controller 410 may further include an input interface 422 and an output interface 424 for communicating transmitted or received data, respectively, to and from various data sources and/or sinks, such as a control and/or data collection module, a user interface, and/or the like. In one or more embodiments, receiver 416 may include a high impedance amplification circuit, such as a high impedance charge and/or electronic amplification circuit. Because high impedance circuits are known to be sensitive to picking up electromagnetic interference, the amplification circuits of receiver 416 may include active electronic devices (e.g., transistors) and/or feedback circuitry to mitigate noise. In one or more embodiments, the input impedance of receiver 416 may be approximately 1 MΩ (e.g., between 500 kΩ and 10 MΩ) or greater. Conversely, transmitter 413 preferably has a low output impedance (e.g., approximately 10Ω or less).

Surface assembly 81 includes a counter electrode 83. Counter electrode 83 is used by transmitter 413 and/or receiver 416 to measure and/or apply a voltage signal between counter electrode 83 and wellhead 40 (FIGS. 1 and 2). A wire 440 couples controller 410 to wellhead 40 (FIGS. 1 and 2) such that a potential difference between counter electrode 83 and wellhead 40 may be measured and/or applied by controller 410. In some embodiments, counter electrode 83 is placed ten or more meters from wellhead 40 (FIGS. 1 and 2).

In a conventional EM telemetry system with a counter electrode, the counter electrode is galvanically coupled to the earth. For example, the counter electrode of a conventional EM telemetry system may include a metal stake, a porous pot, an abandoned well head or oil rig, and/or the like that electrically couples to the earth through electrochemical reactions. More specifically, galvanic counter electrodes operate as electro-chemical transducers that convert electrical conduction from ionic conduction in the formation (i.e., the earth) to electronic conduction in the metal electrode. The electrochemical reactions at the electrodes, involving gain or loss of electrons, are oxidation-reduction reactions. However, accurately and reliably measuring voltage signals using galvanic counter electrodes is problematic for a number of reasons, as discussed below.

Galvanic counter electrodes tend to have a high electrode-formation contact resistance (i.e., the resistance between the counter electrode and the earth). Furthermore, the electrode-formation contact resistance may vary significantly in time and location. Galvanic counter electrodes may be implemented using a solid metal (e.g., steel) or a metal/metal salt (e.g., Ag/AgCl) in contact with formation fluids. In these and similar implementations, the contact resistance of the counter electrode is primarily determined by a transition layer at the surface of the electrodes where electronic conduction in the metal portion of the electrode is converted to and from ionic conduction in the formation. Such a transition layer typically includes two sub-layers of differing electrochemistry. The electrochemistry of this so-called "double layer" is complex and results in a high resistance for current to flow from the electrode into the formation. The presence of a double layer makes it difficult for galvanic counter electrodes to achieve a contact resistance of less than 1 kΩ per electrode, as is desired for many EM telemetry applications. Furthermore, concentrations of different ionic species in the formation fluids vary in time and space. The variability of the formation fluids, which interact with the double layer, causes the contact resistance to be variable in time and/or location.

Galvanic counter electrodes have a low operational lifetime. More specifically, as the electrical conduction into and out of the counter electrode occurs, corresponding chemical degradation (i.e., corrosion) of the electrodes inherently occurs due to the electrochemical reactions that are characteristic of galvanic coupling. Thus, galvanic counter electrodes are not suitable for long term deployment, even when operated intermittently. The operational lifetime of galvanic counter electrodes may be further reduced in offshore applications, where corrosion tends to be accelerated by the presence of salt water.

Galvanic counter electrodes may also undergo temperature-dependent drift, electrochemical noise, and long stabilization times. More specifically, the electrochemical reactions that occur at galvanic counter electrodes may be described by the temperature-dependent Nernst equation, thereby resulting in a strong and undesirable temperature dependence of the contact resistance. Furthermore, the electrochemical reactions that occur at galvanic counter electrodes result in electromagnetic noise (i.e., corrosion noise) that reduces the SNR of the detected signal. Still further, the electrochemical reactions that occur at galvanic counter electrodes often take a long time (e.g., one or more weeks) to reach equilibrium after the electrode is placed.

The above problems associated with galvanic counter electrodes often result in a variable contact resistance that fluctuates over time and/or position between a perfectly grounded asymptote (zero contact resistance) and an ungrounded asymptote (infinite contact resistance). For example, voltage measurements using galvanic electrodes may have an uncertainty of up to 50% due to fluctuations in contact resistance. Thus, galvanic coupling of electrodes to the earth is an unreliable method of voltage sensing in EM telemetry applications. Accordingly, it would be desirable to provide an EM telemetry system with a counter electrode that does not suffer from the deficiencies of galvanic counter electrodes.

Counter electrode 83 of surface assembly 81 is a capacitive counter electrode. In one or more embodiments, capacitive counter electrode 83 may include a conductive plate 432 that is separated from the earth formation 434 by a barrier layer 436. In general, barrier layer 436 is electrically insulating and impervious to fluids in formation 434 so as to prohibit electrical conduction and/or electrochemical reactions between conductive plate 432 and formation 434. Conductive plate 432 is, thus, capacitively coupled to formation 434 via electric fields formed across barrier layer 436. Conductive plate 432 may have various physical properties; for example, conductive plate 432 may be flat, textured, rigid, flexible, metallic, non-metallic, and/or the like. Similarly, barrier layer 436 may have various physical properties; for example, barrier layer 436 may include a passivation layer coated on conductive plate 432. In one or more embodiments, barrier layer 436 may include an air gap. In some embodiments, counter electrode 83 may be formed as a conductor (e.g., copper, aluminum, and/or the like) coated with a passivation layer that does not chemically react with formation 434 and/or fluids therein. In some embodiments, counter electrode 83 may be formed as a conductor made from a material including but not limited to aluminum (Al), tantalum (Ta), titanium (Ti), and/or another suitable metal that is treated so as to form a protective layer at its outer surface. For example, a protective oxide layer may be formed on the outer surface of the conductive material. That is, at least the portion of the electrode that is in contact with the earth formation during operation is oxidized. Aluminum is presented as an example of this, whereby aluminum oxidizes in air to form a 4 nm thick passivation layer of the electrically insulating aluminum oxide on the surface of the aluminum metal. This passivation layer may be further enhanced by anodizing processes. One advantage of using a material such as aluminum for conductive plate 432 is that the protective aluminum oxide layer formed on the aluminum is "self-healing" should the aluminum oxide be penetrated. That is, portions of capacitive plate 432 that are exposed to formation 434 when barrier layer 436 is penetrated are re-oxidized upon exposure to air, thereby reforming a continuous barrier layer 436 and mitigating potential adverse effects of the barrier penetration.

The capacitive coupling between conductive plate 432 and formation 434 offers many advantages over the galvanic coupling mechanism used in counter electrodes of conventional EM telemetry systems. In one or more embodiments, capacitive coupling reduces and/or eliminates many of the problems associated with galvanic electrodes discussed above, including electrode degradation and/or corrosion, temperature drift, and corrosion noise. Moreover, capacitive electrodes stabilize instantly, or nearly instantly, and thus have a much shorter stabilization time than the one or more weeks typical of galvanic electrodes. Still further, because the high contact resistance of a galvanic electrode is eliminated, the voltage signal detected by a capacitive electrode may be advantageously measured using a high impedance receiver, such as receiver 416. Similarly, a low impedance transmitter, such as transmitter 413, may be used to transmit a voltage signal using a capacitive electrode.

Figure 5:
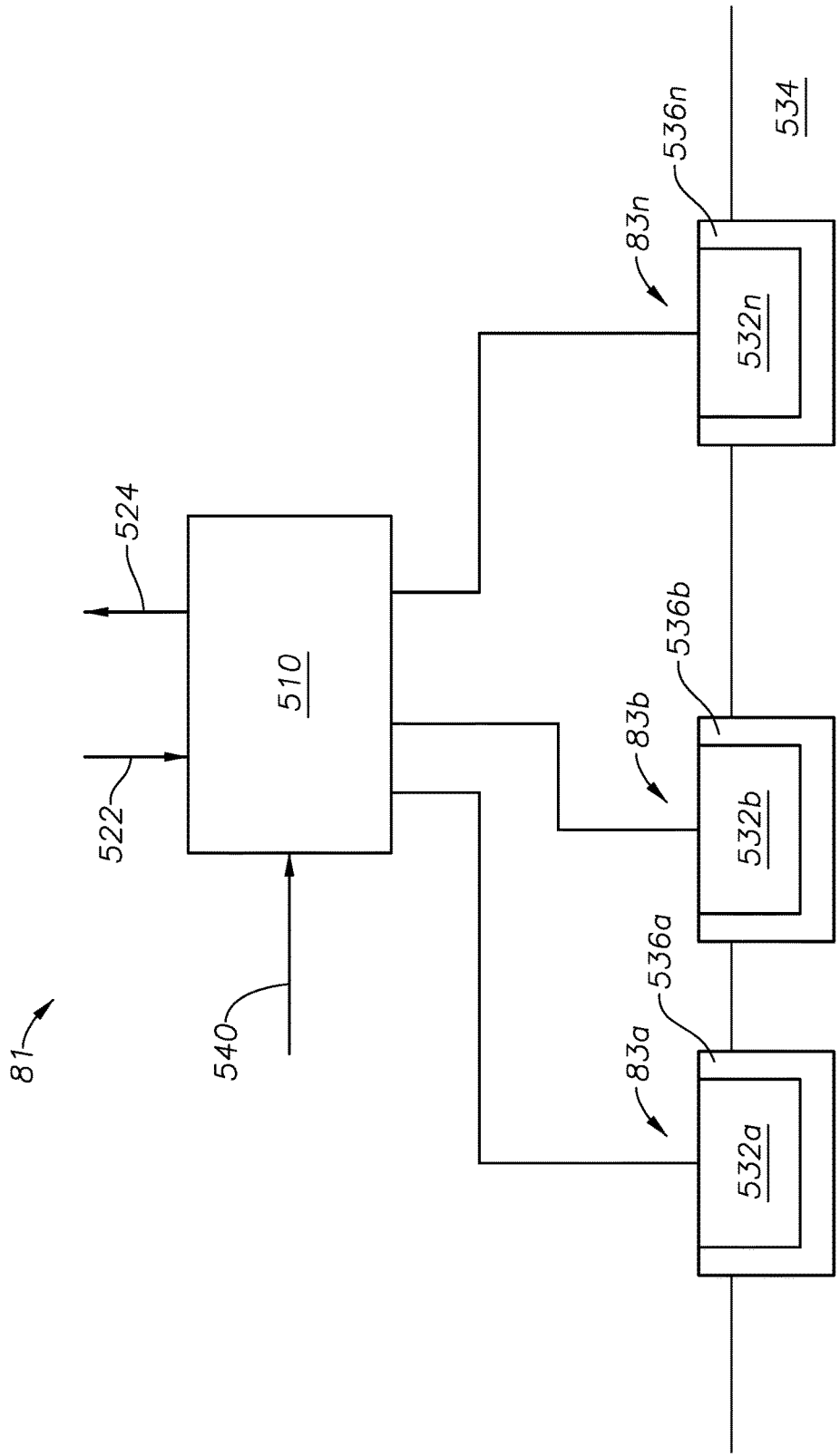
FIG. 5 is a plan view of a surface assembly of an EM telemetry system using a plurality of capacitive counter electrodes of the disclosure.

Although a single capacitive counter electrode 83 is depicted in FIG. 4, it is to be understood that surface assembly 81 may include a plurality of capacitive counter electrodes and/or a combination of one or more capacitive counter electrodes and one or more galvanic counter electrodes. In FIG. 5, an example of surface assembly 81 including a plurality of capacitive counter electrodes 83a, 83b, . . . 83n is depicted according to some embodiments. As in FIG. 4, each of the plurality of capacitive counter electrodes 83a, 83b, . . . 83n includes a corresponding conductive plate 532a, 532b, . . . 532n and barrier layer 536a, 536b, . . . 536n that separates the corresponding conductive plate from the earth formation 534 and/or fluids therein. Controller 510 measures and/or applies a voltage signal from capacitive counter electrodes 83a, 83b, . . . 83n in order to receive and/or transmit information on input and output interfaces 522 and 524. A wire 540 couples controller 510 to wellhead 40 (FIGS. 1 and 2) such that a potential difference between capacitive counter electrodes 83a, 83b, . . . 83n and wellhead 40 may be measured and/or applied by controller 510. In one or more embodiments, capacitive counter electrodes 83a, 83b, . . . 83n may be configured relative to one another as a grid, ring, line, and/or any other suitable array configuration. One advantage of configuring capacitive counter electrodes 83a, 83b, . . . 83n as an array of electrodes is the ability to optimally orient and/or arrange them in order to improve the SNR of EM telemetry system 80.

Figure 6:
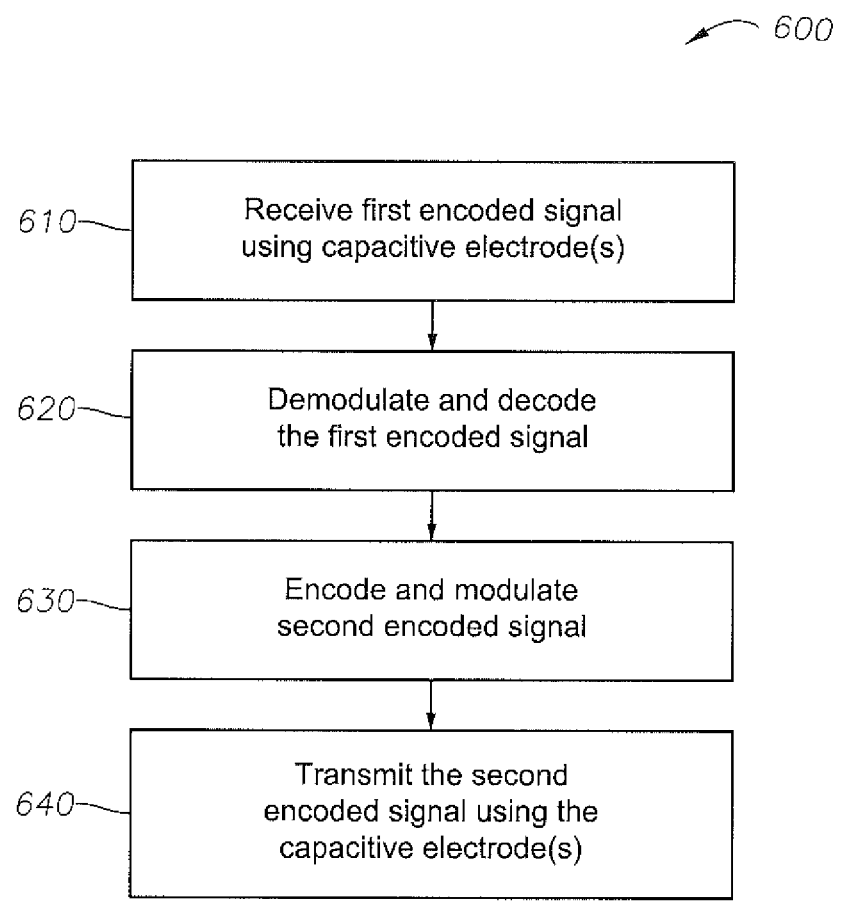
FIG. 6 is a flowchart of a method of EM telemetry using remote referencing.

FIG. 6 shows a simplified diagram of a method 600 of EM telemetry using capacitive electrodes according to some embodiments. According to some embodiments consistent with FIGS. 1-5, EM telemetry system 80 may perform method 600 in order to achieve reliable and accurate communication between a surface assembly (such as surface assembly 81) and a downhole transceiver (such as downhole transceiver 89). More specifically, a controller of the surface assembly, such as controller 410 and/or 510 depicted in FIG. 4 and FIG. 5, respectively, may perform method 600 when communicating with the downhole transceiver.

At step 610, a first encoded signal is received using one or more capacitive counter electrodes, such as capacitive electrode 83. In one or more embodiments, the received encoded signal corresponds to a voltage $V^m$ measured between the counter electrode 83 and wellhead 40. The measured voltage signal $V^m$ may be represented in analog and/or digital format. The measured voltage signal $V^m$ is characterized by a signal-to-noise ratio (SNR) measured by dividing the strength of the encoded signal 90 by the strength of various noise signals. According to some embodiments, the first encoded signal may be transmitted by a downhole transceiver and may carry information from one or more downhole tools to the surface. For example, the first encoded signal 90 may carry data including measurement-while-drilling data and logging-while-drilling data. In one or more embodiments, the voltage difference between the counter electrode 83 and the wellhead 40 may be measured using a high input impedance receiver 416. For example, the receiver may have an input impedance of 1 MΩ or greater.

At step 620, the first encoded signal 90 is demodulated and decoded to recover the information carried in the first encoded signal. Owing to the advantages of capacitive electrodes discussed above, in one or more embodiments the demodulator 415 and decoder 414 operated in accordance with method 600 may generate output data more reliably and/or faster than conventional EM telemetry systems. The demodulation and decoding processes generally mirror the processing steps applied by the downhole transceiver 89 to generate the first encoded signal 90. In one or more embodiments, the encoding and modulation scheme (and corresponding decoding and demodulation scheme) may include pulse width modulation, pulse position modulation, on-off keying, amplitude modulation, frequency modulation, single-side-band modulation, frequency shift keying, phase shift keying (e.g., binary phase shift keying and/or M-ary phase shift keying), discrete multi-tone, orthogonal frequency division multiplexing, and/or the like.

At step 630, a second encoded signal 90 is encoded and modulated. According to some embodiments, the second encoded signal may carry information from the surface 16 to one or more downhole tools. For example, the first encoded signal 90 may carry instructions for the downhole tools, such as directions for directional drilling applications. In one or more embodiments, the encoding and modulation scheme (and corresponding decoding and demodulation scheme) may include pulse width modulation, pulse position modulation, on-off keying, amplitude modulation, frequency modulation, single-side-band modulation, frequency shift keying, phase shift keying (e.g., binary phase shift keying and/or M-ary phase shift keying), discrete multi-tone, orthogonal frequency division multiplexing, and/or the like.

At step 640, the second encoded signal 90 is transmitted using the one or more capacitive counter electrodes. In one or more embodiments, the second encoded signal is transmitted by applying a time-varying differential voltage $V^a$ between the one or more capacitive counter electrodes 83 and wellhead 40. According to some embodiments, the second encoded signal may be received by a downhole transceiver 89 coupled to the downhole tools 330. In one or more embodiments, the voltage between the counter electrode 83 and the wellhead 40 may be applied using a low output impedance transmitter, such as transmitter 413. For example, the transmitter may have an output impedance of 10Ω or less.

Any one of the foregoing methods may be particularly useful during various procedures in a wellbore. Thus, in one or more embodiments, a wellbore may be drilled, and during drilling or during a suspension in drilling, information about downhole equipment disposed in the wellbore may be generated. The downhole equipment may be selected from the group consisting of drilling equipment, logging-while-drilling (LWD) equipment, measurement-while-drilling (MWD) equipment and production equipment Likewise, in one or more embodiments, downhole production equipment may be disposed in a wellbore, and during production operations, information about downhole equipment disposed in the wellbore may be generated. The information may be generated utilizing one or more sensors disposed in the wellbore and selected from the group consisting of temperature sensors, pressure sensors, strain sensors, pH sensors, density sensors, viscosity sensors, chemical composition sensors, radioactive sensors, resistivity sensors, acoustic sensors, potential sensors, mechanical sensors, nuclear magnetic resonance logging sensors, gravity sensor, a pressure sensor, a fixed length line sensor, optical tracking sensor, a fluid metering sensor, an acceleration integration sensor, a velocity timing sensor, an odometer, a magnetic feature tracking sensor, an optical feature tracking sensor, an electrical feature tracking sensor, an acoustic feature tracking sensor, a dead reckoning sensor, a formation sensor, an orientation sensor, an impedance type sensor, and a diameter sensor.

Figure 7:
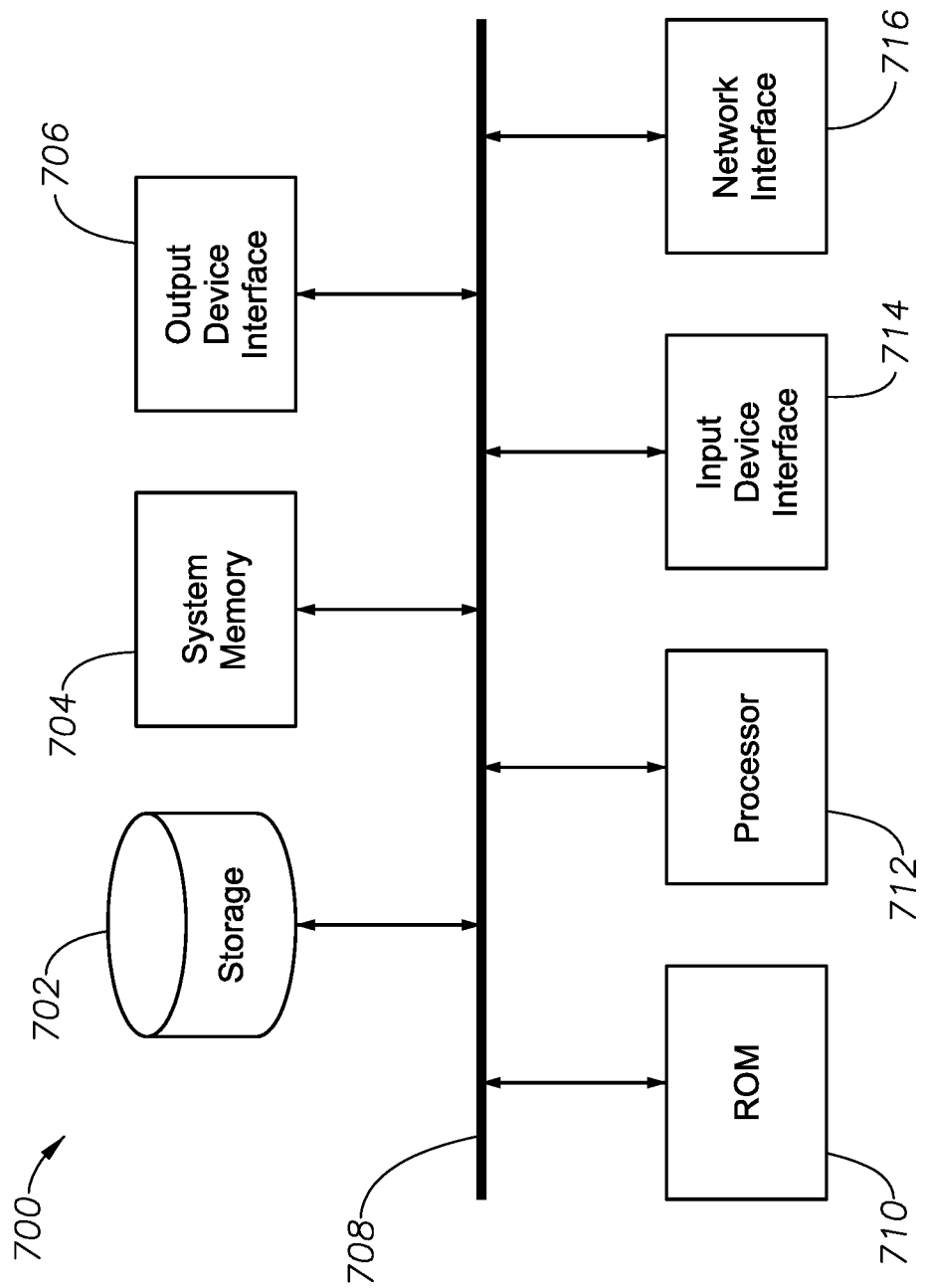
FIG. 7 is a block diagram of a computer of an EM telemetry system of the disclosure.

FIG. 7 is a block diagram of an exemplary computer system 700 in which embodiments of the present disclosure may be adapted for perfoming EM telemetry using remote referencing. For example, the steps of the operations of method 600 of FIG. 6 and/or the components of controller 310 of FIG. 3, controller 410 of FIG. 4, and/or controller 510 of FIG. 5, as described above, may be implemented using system 700. System 700 can be a computer, phone, personal digital assistant (PDA), or any other type of electronic device. Such an electronic device includes various types of computer readable media and interfaces for various other types of computer readable media. As shown in FIG. 7, system 700 includes a permanent storage device 702, a system memory 704, an output device interface 706, a system communications bus 708, a read-only memory (ROM) 710, processing unit(s) 712, an input device interface 714, and a network interface 716.

Bus 708 collectively represents all system, peripheral, and chipset buses that communicatively connect the numerous internal devices of system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of system 700. Permanent storage device 702, on the other hand, is a read-and-write memory device. This device is a non-volatile memory unit that stores instructions and data even when system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory (RAM). System memory 704 stores some of the instructions and data that the processor needs at runtime. In some implementations, the processes of the subject disclosure are stored in system memory 704, permanent storage device 702, and/or ROM 710. For example, the various memory units include instructions for computer aided pipe string design based on existing string designs in accordance with some implementations. From these various memory units, processing unit(s) 712 retrieves instructions to execute and data to process in order to execute the processes of some implementations.

Bus 708 also connects to input and output device interfaces 714 and 706, respectively. Input device interface 714 enables the user to communicate information and select commands to system 700. Input devices used with input device interface 714 include, for example, alphanumeric, QWERTY, or T9 keyboards, microphones, and pointing devices (also called "cursor control devices"). Output device interfaces 706 enables, for example, the display of images generated by system 700. Output devices used with output device interface 706 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 7, bus 708 also couples system 700 to a public or private network (not shown) or combination of networks through a network interface 716. Such a network may include, for example, a local area network (LAN), such as an Intranet, or a wide area network (WAN), such as the Internet. Any or all components of system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of the operations of method 600 of FIG. 6, as described above, may be implemented using system 700 or any computer system having processing circuitry or a computer program product including instructions stored therein, which, when executed by at least one processor, causes the processor to perform functions relating to these methods.

As used in this specification and any claims of this application, the terms "computer," "server," "processor," and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., a data server; a middleware component, e.g., an application server; a front end component, e.g., a client computer having a graphical user interface or a Web browser through which a user can interact with an implementation of the subject matter described in this specification; or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

Thus, an EM telemetry system using capacitive electrodes has been described. Embodiments of an EM telemetry system with capacitive electrodes include a downhole transceiver comprising an encoded signal transmitter, downhole equipment, a downhole sensor disposed to monitor the downhole equipment, the downhole sensor coupled to the transceiver, and an encoded signal receiver comprising one or more capacitive counter electrodes. Likewise, an electromagnetic (EM) telemetry system for use in a wellbore extending from a surface has been described and may generally include downhole equipment disposed in the wellbore, a sensor positioned in the wellbore and disposed to monitor the downhole equipment, a downhole transceiver disposed in the wellbore, the downhole transceiver comprising an encoded signal transmitter, and an encoded signal receiver disposed adjacent the surface, the encoded signal receiver comprising one or more capacitive counter electrodes. Likewise, an EM telemetry system for use with downhole equipment may generally include a downhole transceiver comprising an encoded signal transmitter, a downhole sensor disposed to monitor the downhole equipment, and an encoded signal receiver comprising one or more capacitive counter electrodes.

For any of the foregoing embodiments the system may include any one of the following elements, alone or in combination with each other: the downhole sensor is coupled to the transceiver; the encoded signal receiver is disposed adjacent the surface; the downhole equipment is selected from a group consisting of drilling equipment, logging-while-drilling (LWD) equipment, and measurement-while-drilling (MWD) equipment and production equipment; the sensor is selected from a group consisting of temperature sensors, pressure sensors, strain sensors, pH sensors, density sensors, viscosity sensors, chemical composition sensors, radioactive sensors, resistivity sensors, acoustic sensors, potential sensors, mechanical sensors, nuclear magnetic resonance logging sensors, gravity sensor, a pressure sensor, a fixed length line sensor, optical tracking sensor, a fluid metering sensor, an acceleration integration sensor, a velocity timing sensor, an odometer, a magnetic feature tracking sensor, an optical feature tracking sensor, an electrical feature tracking sensor, an acoustic feature tracking sensor, a dead reckoning sensor, a formation sensor, an orientation sensor, an impedance type sensor, and a diameter sensor; an encoded signal comprising sensor information related to the downhole equipment; the one or more capacitive counter electrodes each comprise a conductive plate and a barrier layer that separates the conductive plate from an earth formation and fluids therein; the barrier layer is electrically insulating and impermeable to the fluids; the barrier layer is self-healing; the conductive plate and the earth formation are capacitively coupled through the barrier layer; the one or more capacitive counter electrodes each comprise a conductor coated in a passivation layer; the conductor is composed of one or more of copper, aluminum, tantalum, and titanium; the one or more capacitive counter electrodes each comprise a metal conductor having an oxidized surface; the oxidized surface is further anodized; the one or more capacitive counter electrodes are arranged in an array configuration; the encoded signal is encoded using at least one of pulse width modulation, pulse position modulation, on-off keying, amplitude modulation, frequency modulation, single-side-band modulation, frequency shift keying, phase shift keying, discrete multi-tone, and orthogonal frequency division multiplexing; the encoded signal receiver has an input impedance of approximately 1 MΩ or greater; the encoded signal receiver comprises a high input impedance amplifier; the high input impedance amplifier has an input impedance of approximately 1 MΩ or greater; a second encoded signal transmitter coupled between the one or more capacitive counter electrodes and a wellhead; the second encoded signal transmitter comprises a low output impedance amplifier; the low output impedance amplifier has an output impedance of approximately 10Ω or less; the encoded signal carries data including one or more of measurement-while-drilling data and logging-while drilling data; the encoded signal carries data including instructions for the downhole equipment; and the instructions include directional drilling instructions for the downhole equipment.

A method for communicating with a downhole transceiver has been described. Embodiments of the method may include receiving a first encoded signal using a capacitive counter electrode and decoding the first encoded signal. The method may further include encoding a second encoded signal and transmitting the second encoded signal using the capacitive electrode. Other embodiments of the method may include monitoring downhole equipment in a wellbore, generating information about the downhole equipment, transmitting an encoded signal including the generated information, and receiving the encoded signal using a capacitive counter electrode.

For the foregoing embodiments, the method may include any one of the following steps, alone or in combination with each other: drilling a wellbore, generating information from within the wellbore about downhole equipment disposed within the wellbore, and transmitting the first encoded signal including the generated information; deploying downhole production equipment in a wellbore, conducting production operations, and generating information from within the wellbore about the production operations or downhole equipment disposed within the wellbore and transmitting the first encoded signal including the generated information; the downhole equipment is selected from a group consisting of drilling equipment, logging-while-drilling (LWD) equipment, and measurement-while-drilling (MWD) equipment and production equipment; the downhole equipment is communicatively coupled to a downhole sensor disposed to monitor the downhole equipment; the sensor is selected from a group consisting of temperature sensors, pressure sensors, strain sensors, pH sensors, density sensors, viscosity sensors, chemical composition sensors, radioactive sensors, resistivity sensors, acoustic sensors, potential sensors, mechanical sensors, nuclear magnetic resonance logging sensors, gravity sensor, a pressure sensor, a fixed length line sensor, optical tracking sensor, a fluid metering sensor, an acceleration integration sensor, a velocity timing sensor, an odometer, a magnetic feature tracking sensor, an optical feature tracking sensor, an electrical feature tracking sensor, an acoustic feature tracking sensor, a dead reckoning sensor, a formation sensor, an orientation sensor, an impedance type sensor, and a diameter sensor; the first encoded signal comprises sensor information related to the downhole equipment; the one or more capacitive counter electrodes each comprise a conductive plate and a barrier layer that separates the conductive plate from an earth formation and fluids therein; the barrier layer is electrically insulating and impermeable to the fluids; the barrier layer is self-healing; the conductive plate and the earth formation are capacitively coupled through the barrier layer; the one or more capacitive counter electrodes each comprise a conductor coated in a passivation layer; the conductor is composed of one or more of copper, aluminum, tantalum, and titanium; the one or more capacitive counter electrodes each comprise a metal conductor having an oxidized surface; the oxidized surface is further anodized; the one or more capacitive counter electrodes are arranged in an array configuration; the first and/or second encoded signal is encoded using at least one of pulse width modulation, pulse position modulation, on-off keying, amplitude modulation, frequency modulation, single-side-band modulation, frequency shift keying, phase shift keying, discrete multi-tone, and orthogonal frequency division multiplexing; the first encoded signal is received by a high input impedance amplifier; the high input impedance amplifier has an input impedance of approximately 1 MΩ or greater; the second encoded signal is transmitted using an encoded signal transmitter coupled between the one or more capacitive counter electrodes and a wellhead; the encoded signal transmitter comprises a low output impedance amplifier; the low output impedance amplifier has an output impedance of approximately 10Ω or less; the first encoded signal carries data including one or more of measurement-while-drilling data and logging-while drilling data; the second encoded signal carries data including instructions for the downhole equipment; the instructions include directional drilling instructions for the downhole equipment; measuring a voltage difference between the counter electrode and a wellhead; and applying a time-varying differential voltage between the one or more capacitive counter electrodes and the wellhead.

While the foregoing disclosure is directed to the specific embodiments of the disclosure, various modifications will be apparent to those skilled in the art. It is intended that all variations within the scope and spirit of the appended claims be embraced by the foregoing disclosure.

What is claimed is:

1. An electromagnetic (EM) telemetry system for use with downhole equipment, the system comprising:
   a downhole transceiver comprising an encoded signal transmitter;
   a downhole sensor disposed to monitor the downhole equipment; and
   an encoded signal receiver comprising one or more capacitive counter electrodes,
   wherein the capacitive counter electrodes include a conductive plate that is separated from an earth formation by an electrically insulating barrier layer; and
   wherein a stabilized non-variable contact resistance of less than 1 K ohm exists between the capacitive counter electrode and the earth formation.

2. The system of claim 1, wherein the downhole sensor is coupled to the transceiver.

3. The system of claim 2, wherein the encoded signal receiver is disposed adjacent the surface.

4. The system of claim 3, further comprising an encoded signal comprising sensor information related to the downhole equipment.

5. The system of claim 4, wherein the one or more capacitive counter electrodes each comprise a conductor coated in a passivation layer.

6. The system of claim 5, wherein the conductor is composed of one or more of copper, aluminum, tantalum, and titanium.

7. The system of claim 4, wherein the one or more capacitive counter electrodes each comprise a metal conductor having an oxidized surface.

8. The system of claim 7, wherein the oxidized surface is further anodized.

9. The system of claim 4, wherein the one or more capacitive counter electrodes are arranged in an array configuration.

10. The system of claim 4, wherein the encoded signal receiver has an input impedance of approximately 1 Mil or greater.

11. The system of claim 4, further comprising a second encoded signal transmitter coupled between the one or more capacitive counter electrodes and a wellhead.

12. The system of claim 1, wherein the barrier layer is electrically insulating and impermeable to fluids.

13. The system of claim 1, wherein the barrier layer is self-healing.

14. The system of claim 1, wherein the conductive plate and the earth formation are capacitively coupled through the barrier layer.

15. A method for communicating with a downhole transceiver, the method comprising:
   receiving a first encoded signal using a capacitive counter electrode;
   decoding the first encoded signal;
   encoding a second encoded signal;
   transmitting the second encoded signal using the capacitive counter electrode, wherein the capacitive counter electrode includes a conductive plate that is separated from an earth formation by an electrically insulating barrier; and
   generating a stabilized non-variable contact resistance of less than 1 K ohm between the capacitive counter electrode and the earth formation.

16. The method of claim 15, wherein the first encoded signal carries data including one or more of measurement-while-drilling data and logging-while drilling data.

17. The method of claim 15, wherein the second encoded signal carries data including instructions for downhole equipment coupled to the downhole transceiver.

18. The method of claim 15, further comprising measuring a voltage difference between the counter electrode and a wellhead.

19. The method of claim 18, further comprising applying a time-varying differential voltage between the one or more capacitive counter electrodes and the wellhead.

* * * * *